(12) United States Patent
Morishita

(10) Patent No.: US 9,156,694 B2
(45) Date of Patent: Oct. 13, 2015

(54) POROUS CARBON AND METHOD OF MANUFACTURING SAME

(75) Inventor: Takahiro Morishita, Osaka (JP)

(73) Assignee: TOYO TANSO CO., LTD., Osaka-shi (JP)

( * ) Notice: Subject to any disclaimer, the term of this patent is extended or adjusted under 35 U.S.C. 154(b) by 117 days.

(21) Appl. No.: 13/255,201

(22) PCT Filed: Mar. 10, 2010

(86) PCT No.: PCT/JP2010/053956
§ 371 (c)(1),
(2), (4) Date: Sep. 7, 2011

(87) PCT Pub. No.: WO2010/104102
PCT Pub. Date: Sep. 16, 2010

(65) Prior Publication Data
US 2011/0318254 A1  Dec. 29, 2011

(30) Foreign Application Priority Data

Mar. 10, 2009 (JP) ................................. 2009-056521

(51) Int. Cl.
| | |
|---|---|
| *C01B 31/00* | (2006.01) |
| *C01B 31/08* | (2006.01) |
| *B82Y 30/00* | (2011.01) |
| *C04B 35/524* | (2006.01) |
| *C04B 38/00* | (2006.01) |

(52) U.S. Cl.
CPC ................. *C01B 31/00* (2013.01); *B82Y 30/00* (2013.01); *C01B 31/08* (2013.01); *C04B 35/524* (2013.01); *C04B 38/0032* (2013.01); *C01P 2006/12* (2013.01); *C01P 2006/13* (2013.01); *C04B 2235/3206* (2013.01); *C04B 2235/3208* (2013.01); *C04B 2235/5409* (2013.01); *C04B 2235/5454* (2013.01); *C04B 2235/6028* (2013.01); *C04B 2235/72* (2013.01); *C04B 2235/723* (2013.01); *C04B 2235/726* (2013.01); *C04B 2235/727* (2013.01)

(58) Field of Classification Search
CPC ...... C01B 31/00; C01B 31/08; C01P 2006/16
See application file for complete search history.

(56) References Cited

U.S. PATENT DOCUMENTS

| 6,064,560 | A   * | 5/2000  | Hirahara et al. ............... 361/502 |
| 6,228,803 | B1    | 5/2001  | Gadkaree et al. |
| 6,248,691 | B1    | 6/2001  | Gadkaree et al. |
| 6,329,316 | B1  * | 12/2001 | Ogasa et al. ................... 502/416 |
| 8,227,376 | B2  * | 7/2012  | Karles et al. .................. 502/404 |

FOREIGN PATENT DOCUMENTS

| CN | 1281383 A    | 1/2001 |
| JP | 9-86914 A    | 3/1997 |
| JP | 2002-502792 A | 1/2002 |
| JP | 2003-104720 A | 4/2003 |
| JP | 2004-26954 A  | 1/2004 |
| JP | 2006-62954 A  | 3/2006 |
| JP | 2008-13394 A  | 1/2008 |

OTHER PUBLICATIONS

R. Ryoo et al., "Synthesis of Highly Ordered Carbon Molecular Sieves via Template-Mediated Structural Transformation", The Journal of Physical Chemistry B, vol. 103, No. 37, Sep. 16, 1999, pp. 7743-7746.
International Search Report of PCT/JP2010/053956, date of mailing Jun. 15, 2010.
Chinese Office Action issued Feb. 7, 2013, issued in corresponding Chinese Patent Application No. 201080008246.3; with English translation (14 pages).
Chinese Office Action dated Oct. 17, 2013, issued in corresponding Chinese Patent Application No. 201080008246.3, w/ English translation (15 pages).
Morishita, Takahiro et al., "Preparation of porous carbons from thermoplastic precursors and their performance for electric double layer capacitors", Carbon, 2006, vol. 44, pp. 2360-2367, Taiwanese Office Action dated Feb. 6, 2014 (8 pages).
Taiwanese Office Action dated Feb. 6, 2014, issued in corresponding Taiwanese application No. 099106934, w/ English translation (20 pages).
Japanese Office Action dated Dec. 11, 2013 in corresponding Japanese Application No. 2009-056521w/English Translation. (11 pages).
Office Action dated Apr. 30, 2014, issued in Corresponding Chinese Patent Application No. 201080008246.3, with English Translation (16 pages).
Presentation of Publications and the Like dated Jun. 9, 2014, issued in corresponding Japanese Patent Application No. 2009-56521 with English translation (12 pages).
T. Morishita et al., "Preparation of controlled pore structure carbon powders that obtained by carbon coating process", Processing of the 35th Annual Meeting of the Carbon Society of Japan, Nov. 28, 2008, Tokyo, Japan.
Taiwanese Office Action dated Jul. 22, 2014, issued in corresponding Taiwanese Application No. 099119935, w/ English translation (25 pages).

* cited by examiner

*Primary Examiner* — Stuart Hendrickson
(74) *Attorney, Agent, or Firm* — Westerman, Hattori, Daniels & Adrian, LLP

(57) ABSTRACT

A porous carbon that retains a three-dimensional network structure and enables the pore diameters of mesopores and micropores to be controlled easily is provided. A method of manufacturing the porous carbon is also provided. The porous carbon is fabricated by mixing a polyamic acid resin 1 as a carbon precursor with magnesium oxide 2 as template particles, heat-treating the mixture in a nitrogen atmosphere at 1000° C. for 1 hour to cause the polyamic acid resin to undergo heat decomposition, and washing the resultant sample with a sulfuric acid solution at a concentration of 1 mol/L to dissolve MgO away.

17 Claims, 8 Drawing Sheets

POROUS CARBON AND METHOD OF MANUFACTURING SAME

TECHNICAL FIELD

The present invention relates to a porous carbon and methods of manufacturing the porous carbon. More particularly, the invention relates to a porous carbon fabricated using a source material with a relatively high carbon yield, and a method of manufacturing the same.

BACKGROUND ART

It has been known that activated carbon, which is a porous carbon, may be fabricated by a method in which a source material is heated and carbonized under a non-oxidizing atmosphere. Examples of the source material include: plant-originating source materials such as lignin, cellulosic substances including wool pulp, saw dust, coconut husk, cottonseed hull, and chaff, starchy substances including foxtail millet, Japanese barnyard millet, and corn; mineral-originating source materials such as coal, tar, and petroleum pitch; and synthetic resins such as phenolic resin and polyacrylonitrile. The techniques for treating the carbonized substances of these source materials with a chemical agent to activate the carbonized substances are also well known.

Recently, it has been confirmed that activated carbon having a specific surface area as high as 3000 $m^2/g$ can be obtained by using potassium hydroxide as an activator agent, mixing an organic resin with the activator agent, and heating it under a non-oxidizing atmosphere, which has drawn attention (see Patent Document 1).

However, for commercial use on an industrial scale, this method still has many problems as follows. For example, it requires an activator agent in an amount more than four times the amount of the organic resin. For that reason, the recovery and recycling of potassium is attempted, but the recovery rate is low, increasing the cost. Moreover, alkali metal evaporates during the heating process for the activation, contaminating or damaging the heating furnace, and it also can be a cause of erosion when used for various industrial materials. Furthermore, activated carbon treated with an alkali metal compound is highly flammable and therefore easily catches fire.

In view of such problems, the following proposals have been made.

(1) A method of fabricating activated carbon that includes a step of mixing an organic resin with at least one alkaline-earth metal compound selected from an oxide, a hydroxide, a carbonate, and an organic salt of an alkaline-earth metal, and sintering the mixture in a non-oxidizing atmosphere (see Patent Document 2).

(2) A method of fabricating activated carbon, characterized by using an organic acid-magnesium salts (for example, magnesium citrate) having 6 or more carbon atoms in the structural formula as the source material, heating the organic acid-magnesium salts to 300° C. or higher under an inert atmosphere, and thereafter cooling and acid-washing it (see Patent Document 3).

CITATION LIST

Patent Documents

[Patent Document 1]
Japanese Published Unexamined Patent Application No. 09-086914 A

[Patent Document 2]
Japanese Published Unexamined Patent Application No. 2006-062954 A

[Patent Document 3]
Japanese Published Unexamined Patent Application No. 2008-013394 A

SUMMARY OF THE INVENTION

Problems to be Solved by the Invention

However, when an organic resin is used as a carbon source material as in the foregoing proposal (1), the carbon yield is low, so the hollow portion becomes large and the mesopores cannot form. As a consequence, carbon powder that does not have a three-dimensional network structure is produced. In particular, when PVA (polyvinyl alcohol) powder is used as the organic resin as described in the examples thereof, the resin is decomposed and its weight is decreased by about 98% during the heat-treatment. Therefore, mesopores are not formed at all, and the resultant material completely becomes carbon powder.

The foregoing proposal (2) also has similar problems. Moreover, this proposal has an additional problem that the applications are extremely limited, for example, to battery electrode materials, for the reason that it uses an organic salt.

In view of the foregoing, it is an object of the present invention to provide a porous carbon that retains a three-dimensional network structure and enables the pore sizes of mesopores and micropores to be controlled easily, and also to provide a method of manufacturing the porous carbon.

Means for Solving the Problems

In order to accomplish the foregoing object, the present invention provides a porous carbon having mesopores and micropores being smaller than the mesopores, characterized in that: a carbonaceous wall constituting an outer wall of the mesopores forms a three-dimensional network structure; the mesopores are configured to have substantially the same size as each other; and the micropores are formed at positions in the carbonaceous wall facing the mesopores.

When the carbonaceous wall constituting the outer wall of the mesopores forms a three-dimensional network structure and the micropores are formed at positions in the carbonaceous wall facing the mesopores as described above, the effective adsorption area per unit amount can be increased, or the amount of capillary condensation in the pores can be increased. In addition, when the mesopores are configured to have substantially the same size as each other, the porous carbon can serve the purposes sufficiently in the case where the porous carbon is used for the purposes of purifying or catalyst, for example. Moreover, when the carbonaceous wall constituting the outer wall of the mesopores forms a three-dimensional network structure, the porous carbon can be used suitably in the case where the porous carbon needs to have flexibility.

In the present specification, the pores having a pore diameter of less than 2 nm are referred to as "micropores," the pores having a pore diameter of from 2 nm to 50 nm are referred to as "mesopores," and the pores having a pore diameter of greater than 50 nm are referred to as "macropores." In addition, all of these pores may be generically referred to as "pores."

It is desirable that the carbonaceous wall comprise carbon portions and hollow portions, and that the volume of the carbon portion be 40% or greater with respect to the total volume of the carbonaceous wall.

When the volume of the carbon portion is 40% or greater with respect to the total volume of the carbonaceous wall, the micropores develop more easily, so very small pores in the carbonaceous wall.

It is desirable that the mesopores be open pores, and that the hollow portions be connected to each other.

When the hollow portions are connected to each other, gas flow becomes smoother, so the porous carbon can capture gas more easily.

It is desirable that the pore diameter of the pores including the mesopores and micropores is from 0.3 nm to 100 nm.

If the pore diameter is less than 0.3 nm, it is difficult to fabricate the porous carbon. On the other hand, if the pore diameter exceeds 100 nm, the amount of the carbonaceous wall per unit volume is so small that the three-dimensional network structure may not be retained.

It is desirable that the specific surface area be from 600 $m^2/g$ to 2000 $m^2/g$.

If the specific surface area is less than 600 $m^2/g$, the amount of the pores formed is insufficient, so the three-dimensional network structure does not form. On the other hand, if the specific surface area exceeds 2000 $m^2/g$, the shape of the carbonaceous wall cannot be retained, and the particles may be disintegrated.

It is desirable that the total pore capacity be from 0.2 mL/g to 3.0 mL/g when the surface area is as described above.

The present invention also provides a method of manufacturing a porous carbon, comprising the steps of: mixing a flowable material containing an organic resin and having a carbon yield of from 40% to 85% with template particles having substantially the same diameter as each other and comprising at least one alkaline-earth metal compound selected from the group consisting of an oxide, a hydroxide, a carbonate, and an organic salt of an alkaline-earth metal, to prepare a mixture; sintering the mixture in a non-oxidizing atmosphere to prepare a sintered substance; and removing the template particles in the sintered substance.

By using the template particles having substantially the same particle diameter as each other, the template particles are uniformly dispersed in the matrix (i.e., in the sintered substance), so the variations in the gaps between the template particles become small. As a result, it is possible to obtain a three-dimensional network structure in which the thickness of the carbonaceous wall is nearly uniform. If the carbon yield of the flowable material is excessively small or excessively large (specifically, if the carbon yield of the flowable material is less than 40% or greater than 85%), carbon powder in which the three-dimensional network structure is not retained is produced. However, the present invention uses a flowable material having a carbon yield of from 40% to 85%, and therefore, it is possible to obtain a porous carbon having a three-dimensional network structure such that the locations in which the template particles have existed are turned into continuous pores after removing the template particles. Moreover, when using the template particles having substantially the same particle diameter as each other, continuous pores having the same size are formed, and therefore, a spongy and substantially cage-like porous carbon can be fabricated.

In addition, the diameter of the pores, the pore distribution of the porous carbon, and the thickness of the carbonaceous wall can be adjusted by varying the diameter of the template particles and the type of the organic resin. Therefore, by appropriately selecting the diameter of the template particles and the type of the organic resin, it becomes possible to fabricate a porous carbon having more uniform pore diameters and a greater pore capacity. Moreover, since the flowable material containing an organic resin is used as the carbon source and the porous carbon can be fabricated without an activation treatment process, so the resultant porous carbon has a very high purity.

In addition, when the carbon yield of the flowable material is within the foregoing range, the micropores develop greatly, so the specific surface area becomes to large. However, when no template particle is used even if the carbon yield of the flowable material is within the foregoing range, the micropores do not develop.

The reason why an alkaline-earth metal compound is used for the template particles is that, because the alkaline-earth metal compound can be removed by a weak acid or hot water (that is, the template particles can be removed without using a strong acid), the properties of the porous carbon itself can be prevented from changing in the step of removing the template particles. The use of a weak acid has an advantage that the speed of the removing becomes faster. On the other hand, the use of hot water has an advantage that it is possible to prevent the acid from remaining as an impurity. In addition, the oxide solution in which the oxide is dissolved in the step of removing the template particles can be re-used as a source material, so the manufacturing cost of the porous carbon can be reduced.

It is desirable that the flowable material show flowability at a temperature of 200° C. or lower. Specifically, an example of the flowable material is at least one substance selected from the group consisting of a polyimide, a phenolic resin, and a pitch, the polyimide, each of the phenolic resin, and the pitch having at least one nitrogen or fluorine atom in its unit structure.

However, the flowable material is not limited to the one showing flowability at a temperature of 200° C. or lower. Even if the flowable material does not show flowability at a temperature of 200° C. or lower, the flowable material may be used in the present invention as long as the flowable material is a polymer material soluble in water or an organic solvent.

It is desirable that, in the step of removing the template particles, the remaining ratio of the template particles after the removing be restricted to 0.5% or less.

The reason is that when the remaining ratio of the template particles after the removing exceeds 0.5%, the region that cannot serve the role of the pores forms in a wide area because the amount of the template particles remaining in the mesopores is large.

Advantages of the Invention

The porous carbon of the present invention exhibits significant advantageous effects of retaining a three-dimensional network structure and enabling the pore diameter to be controlled easily.

BRIEF DESCRIPTION OF THE DRAWINGS

FIG. 1 illustrates a process of manufacturing the present invention carbon, wherein FIG. 1(a) shows a state in which a polyamic acid resin and magnesium oxide are mixed; FIG. 1(b) shows a mixture that has been heat-treated, and FIG. 1(c) shows porous carbon.

BEST MODE FOR CARRYING OUT THE INVENTION

Figure 1:
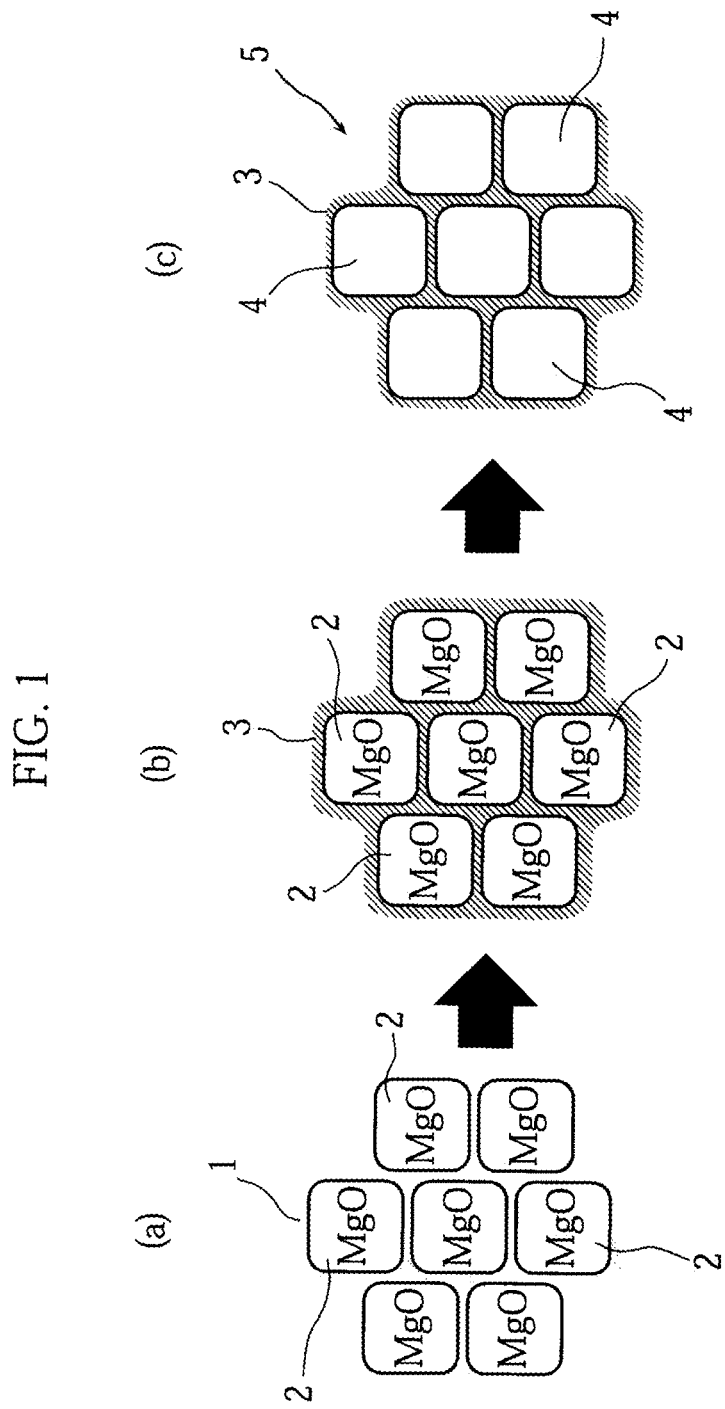

Hereinbelow, embodiments of the present invention will be described.

A carbonized substance of the present invention is a carbonized substance having a specific surface area of 600 m²/g or greater as determined by a nitrogen adsorption method, the carbonized substance being obtained by wet-blending or dry-blending a polyimide containing at least one nitrogen or fluorine atom in its unit structure, a resin having a carbon yield of higher than 40 wt. %, such as a phenolic resin, or a pitch, with an oxide in a solution or powder state, then carbonizing the mixture under a non-oxidizing atmosphere or a reduced pressure of 133 Pa (1 torr) or less at a temperature of 500° C. or higher, and washing the resultant carbon and oxide.

Here, the polyimide containing at least one nitrogen or fluorine atom in its unit structure can be obtained by polycondensation of an acid component and a diamine component. However, in this case, it is necessary that either one of or both of the acid component and the diamine component contain at least one nitrogen atom or fluorine atom.

Specifically, a polyamic acid, which is the precursor of the polyimide, is deposited, and the solvent is removed by heating, to obtain a polyamic acid film. Next, the obtained polyamic acid film is subjected to heat imidization at 200° C. or higher, so that the polyimide can be fabricated.

Examples of the diamine include: aromatic diamines including: 2,2-Bis(4-aminophenyl)hexafluoropropane, 2,2'-Bis(trifluoromethyl)-benzidine, and 4,4'-diaminooctafluorobiphenyl; and 3,3'-difluoro-4,4'-diaminodiphenylmethane, 3,3'-difluoro-4,4'-diaminodiphenylether, 3,3'-di(trifluoromethyl)-4,4'-diaminodiphenylether, 3,3'-difluoro-4,4'-diaminodiphenylpropane, 3,3'-difluoro-4,4'-diaminodiphenylhexafluoropropane, 3,3'-difluoro-4,4'-diaminobenzophenone, 3,3',5,5'-tetrafluoro-4,4'-diaminodiphenylmethane, 3,3',5,5'-tetra(trifluoromethyl)-4,4'-diaminodiphenylmethane, 3,3',5,5'-tetrafluoro-4,4'-diaminodiphenylpropane, 3,3',5,5'-tetra(trifluoromethyl)-4,4'-diaminodiphenylpropane, 3,3',5,5'-tetrafluoro-4,4-diaminodiphenylhexafluoropropane, 1,3-diamino-5-(perfluorononenyloxy)benzene, 1,3-diamino-4-methyl-5-(perfluorononenyloxy)benzene, 1,3-diamino-4-methoxy-5-(perfluorononenyloxy)benzene, 1,3-diamino-2,4,6-trifluoro-5-(perfluorononenyloxy)benzene, 1,3-diamino-4-chloro-5-(perfluorononenyloxy)benzene, 1,3-diamino-4-pbromo-5-(perfluorononenyloxy)benzene, 1,2-diamino-4-(perfluorononenyloxy)benzene, 1,2-diamino-4-methyl-5-(perfluorononenyloxy)benzene, 1,2-diamino-4-methoxy-5-(perfluorononenyloxy)benzene, 1,2-diamino-3,4,6-trifluoro-5-(perfluorononenyloxy)benzene, 1,2-diamino-4-chloro-5-(perfluorononenyloxy)benzene, 1,2-diamino-4-bromo-5-(perfluorononenyloxy)benzene, 1,4-diamino-3-(perfluorononenyloxy)benzene, 1,4-diamino-2-methyl-5-(perfluorononenyloxy)benzene, 1,4-diamino-2-methoxy-5-(perfluorononenyloxy)benzene, 1,4-diamino-2,3,6-trifluoro-5-(perfluorononenyloxy)benzene, 1,4-diamino-2-chloro-5-(perfluorononenyloxy)benzene, 1,4-diamino-2-pbromo-5-(perfluorononenyloxy)benzene, 1,3-diamino-5-(perfluorohexenyloxy)benzene, 1,3-diamino-4-methyl-5-(perfluorohexenyloxy)benzene, 1,3-diamino-4-methoxy-5-(perfluorohexenyloxy)benzene, 1,3-diamino-2,4,6-trifluoro-5-(perfluorohexenyloxy)benzene, 1,3-diamino-4-chloro-5-(perfluorohexenyloxy)benzene, 1,3-diamino-4-bromo-5-(perfluorohexenyloxy)benzene, 1,2-diamino-4-(perfluorohexenyloxy)benzene, 1,2-diamino-4-methyl-5-(perfluorohexenyloxy)benzene, 1,2-diamino-4-methoxy-5-(perfluorohexenyloxy)benzene, 1,2-diamino-3,4,6-trifluoro-5-(perfluorohexenyloxy)benzene, 1,2-diamino-4-chloro-5-(perfluorohexenyloxy)benzene, 1,2-diamino-4-bromo-5-(perfluorohexenyloxy)benzene, 1,4-diamino-3-(perfluorohexenyloxy)benzene, 1,4-diamino-2-methyl-5-(perfluorohexenyloxy)benzene, 1,4-diamino-2-methoxy-5-(perfluorohexenyloxy)benzene, 1,4-diamino-2,3,6-trifluoro-5-(perfluorohexenyloxy)benzene, 1,4-diamino-2-chloro-5-(perfluorohexenyloxy)benzene, 1,4-diamino-2-bromo-5-(perfluorohexenyloxy)benzene; and p-phenylenediamine (PPD) and dioxydianiline, which do not contain fluorine atoms. It is also possible that two or more of the foregoing aromatic diamines may be used in combination as the diamine component.

Examples of the acid component include: 4,4'-(hexafluoroisopropylidene)diphthalic anhydride (6FDA), which contains fluorine atoms; and 3,4,3',4'-biphenyltetracarboxylic dianhydride (BPDA) and pyromellitic dianhydride (PMDA), which contains no fluorine atom.

Examples of the organic solvent used as the solvent for the polyimide precursor include N-methyl-2-pyrrolidone and dimethylformamide.

The technique for imidization may follow either heat imidization or chemical imidization as indicated by known methods [for example, see "Shin Kobunshi Jikkengaku, 3, Kobunshi no Gosei•Hanno (2)" (Experimental Polymer Science, New Edition, 3, Synthesis and reaction of polymer [2]), edited by Society of Polymer Science, Japan, Kyoritsu Shuppan, Tokyo, Mar. 28, 1996, p. 158]. The present invention is not limited to this method of imidization.

Furthermore, it is possible to use a resin having a carbon yield of 40% or higher, such as petroleum-based tar pitch and an acrylic resin, other than the polyimide.

Examples of the source material used as the above-mentioned oxide include alkaline-earth metal oxides (metal organic acids the state of which changes into magnesium oxide during the thermal decomposition process by a heat treatment (including magnesium citrate, magnesium oxalate, calcium citrate, and calcium oxalate) in addition to, for example, magnesium oxide and calcium oxide).

As the cleaning solution for removing the oxide, it is preferable to use a dilute acid of 2 mol/L or lower of a common inorganic acid, such as hydrochloric acid, sulfuric acid, nitric acid, citric acid, acetic acid, and formic acid. It is also possible to use hot water of 80° C. or higher.

Furthermore, in order to obtain the porous carbon of the present invention, it is preferable that the carbonization be performed under a non-oxidizing atmosphere at a temperature of from 500° C. to 1500° C. The reason is as follows. Because the resin having a high carbon yield is a polymer, the carbonization is insufficient and the pores do not develop sufficiently at a temperature of less than 600° C. On the other hand, at a temperature of higher than 1500° C., the shrinkage is great and the oxide is sintered and made into a large size; therefore, the pore size becomes small and the specific surface area becomes small.

EXAMPLES

Example 1

First, as illustrated in FIG. 1(a), a polyamic acid resin 1 (imide-based resin) as a carbon precursor and magnesium oxide 2 (MgO, average crystallite size 100 nm) as template particles were mixed at a weight ratio of 90:10. Next, as illustrated in FIG. 1(b), the mixture was heat-treated in a nitrogen atmosphere at 1000° C. for 1 hour, to allow the polyamic acid resin to undergo heat decomposition, so that carbon 3 was prepared. Lastly, as illustrated in FIG. 1(c), the resultant carbon 3 was washed with a sulfuric acid solution added at a concentration of 1 mol/L, to dissolve the MgO away completely, whereby porous carbon 5 having a multiplicity of pores 4 was obtained.

The porous carbon fabricated in this manner is hereinafter referred to as a present invention carbon A1.

Figure 2:
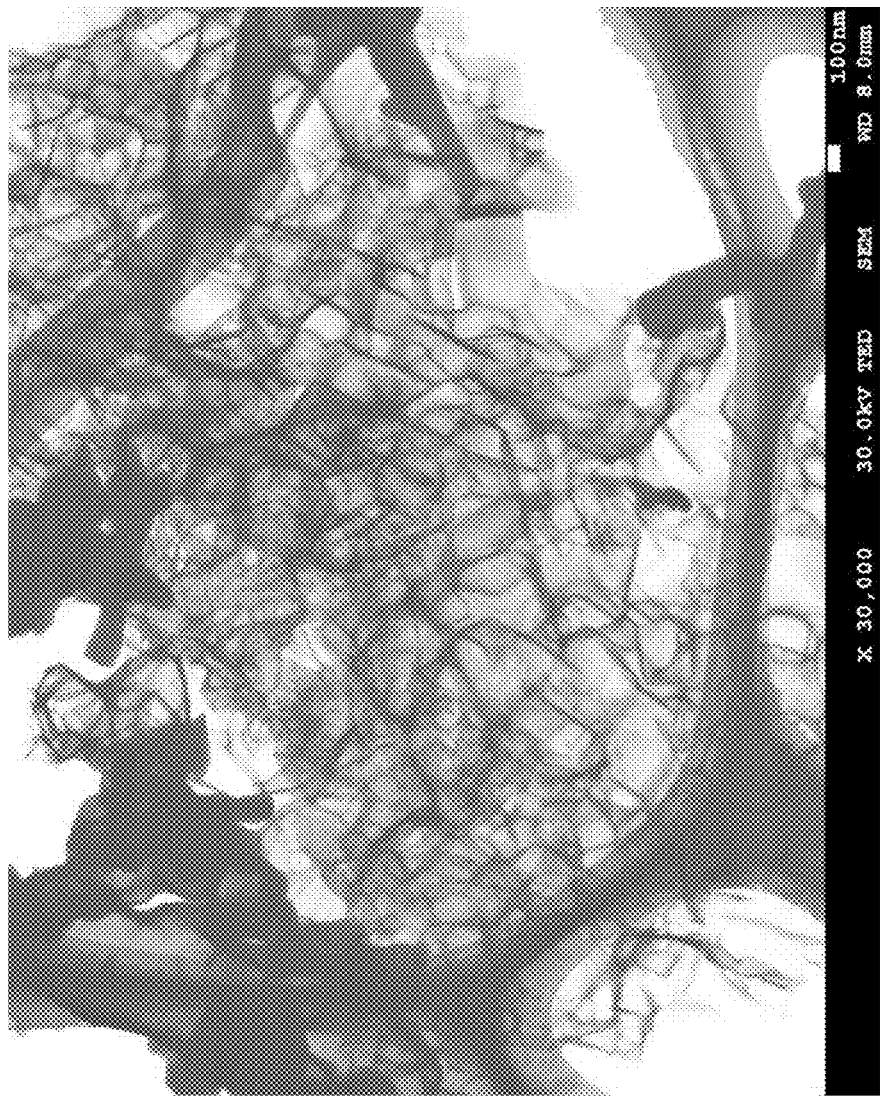
FIG. 2 is a STEM (scanning transmission electron microscope) photograph of a present invention carbon A1.
Figure 3:
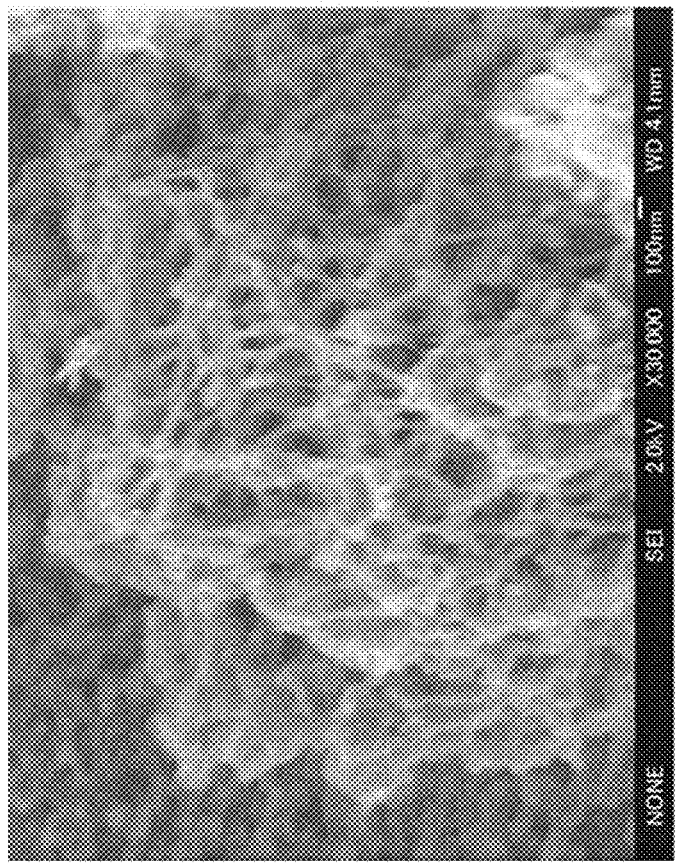
FIG. 3 is a SEM (scanning electron microscope) photograph of the present invention carbon A1.
Figure 4:
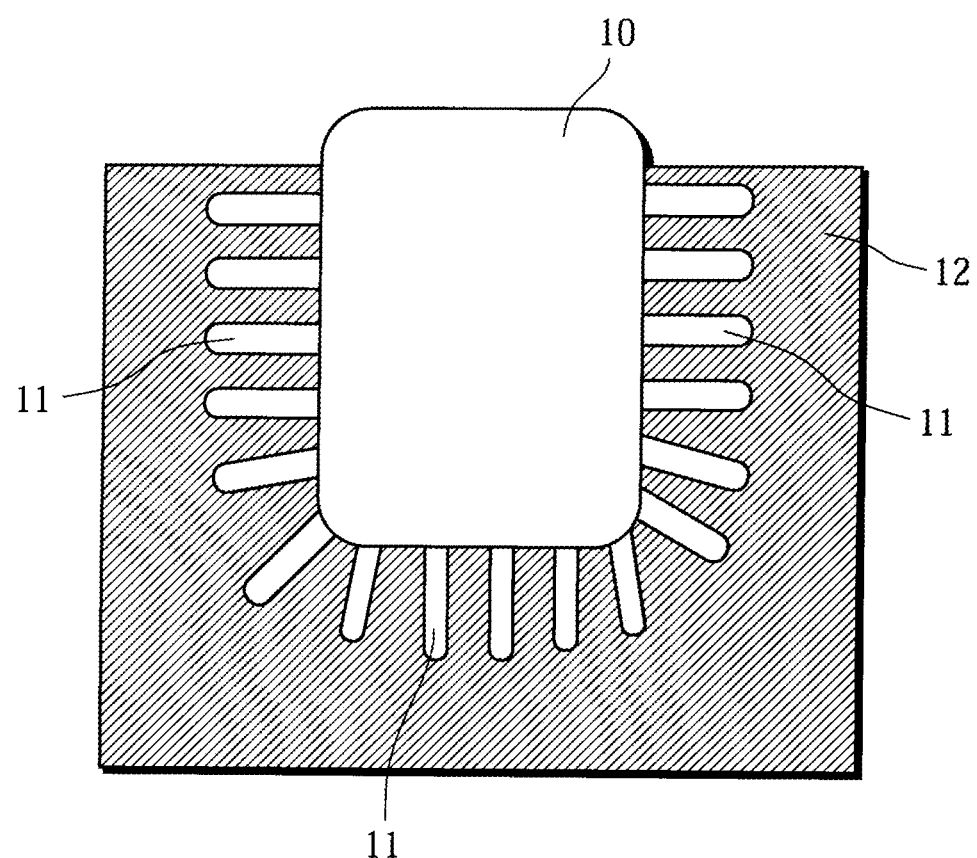
FIG. 4 is a schematic view illustrating the condition of a present invention carbon.

FIGS. 2 and 3 respectively show a STEM (scanning transmission electron microscope) photograph and a SEM (scanning electron microscope) photograph of the present invention carbon A1. As clearly seen from the two figures, it is observed that the present invention carbon A1 has a three-dimensional network structure (spongy carbon form). More specifically, as illustrated in FIG. 4, the present invention carbon A1 has such a structure that it has a large number of mesopores 10, which have almost the same size as each other, and micropores 11 are formed at the positions in a carbonaceous wall 12 that face the mesopores 10.

In the present invention carbon A1, the volume of the carbon portion was found to be 40% based on the total volume of the carbonaceous wall, the pore diameter of the micropores was 10 nm, and the specific surface area was 700 m$^2$/g. The pore diameter of the micropores was calculated using the HK method, and the pore diameter of the mesopores was calculated using the BJH method.

Example 2

Porous carbon was fabricated in the same manner as described in Example 1 above, except that the average crystallite size of the magnesium oxide was 5 nm.

The porous carbon fabricated in this manner is hereinafter referred to as a present invention carbon A2.

Figure 5:
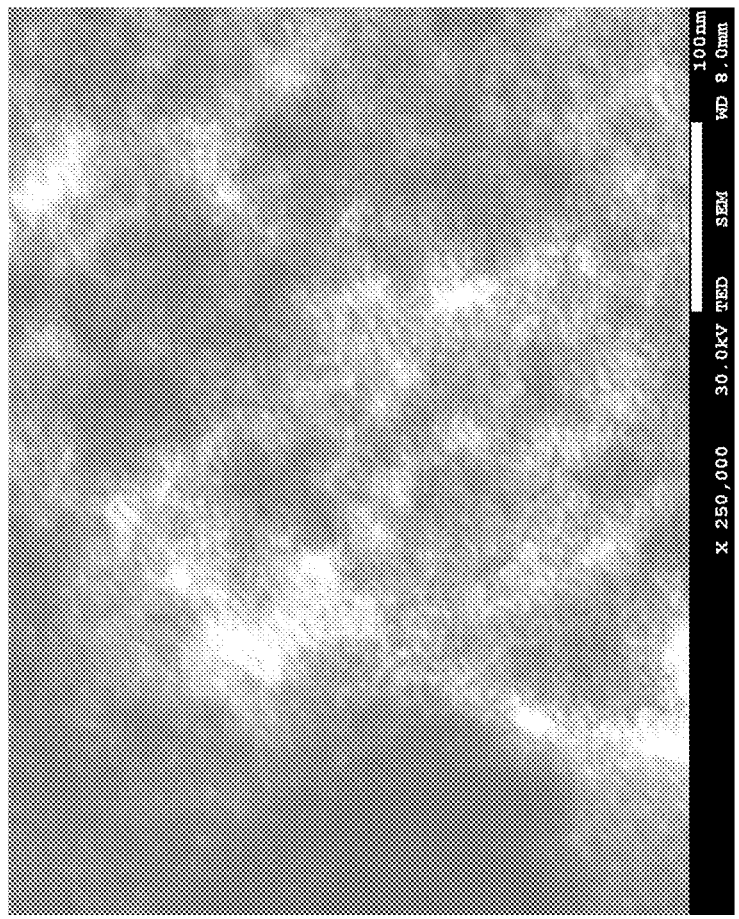
FIG. 5 is a STEM (scanning transmission electron microscope) photograph of a present invention carbon A2.
Figure 6:
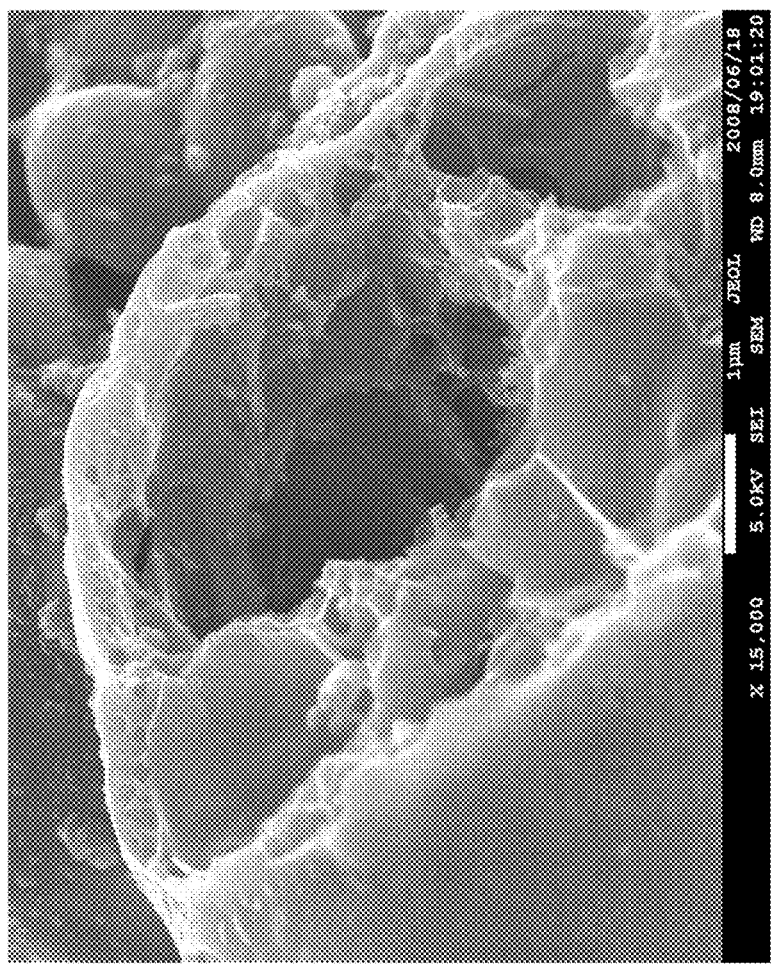
FIG. 6 is a SEM (scanning electron microscope) photograph of the to present invention carbon A2.

FIGS. 5 and 6 respectively show a STEM (scanning transmission electron microscope) photograph and a SEM (scanning electron microscope) photograph of the present invention carbon A2. As clearly seen from the two figures, it is observed that the present invention carbon A2 has a three-dimensional network structure (spongy carbon form).

Comparative Example 1

Porous carbon was fabricated in the same manner as described in Example 1 above, except that no magnesium oxide as the template particles was added.

The porous carbon fabricated in this manner is hereinafter referred to as a comparative carbon Z1.

Comparative Example 2

Porous carbon was fabricated in the same manner as described in Example 1 above, except that PVA (polyvinyl alcohol) was used as the carbon precursor in place of the polyamic acid resin.

The porous carbon fabricated in this manner is hereinafter referred to as a comparative carbon Z2.

(Experiment 1)

The relationship between the pressure and the amount of $N_2$ adsorbed was studied for the present invention carbons A1 and A2 as well as the comparative carbons Z1 and Z2. The results are shown in FIG. 7.

Figure 7:
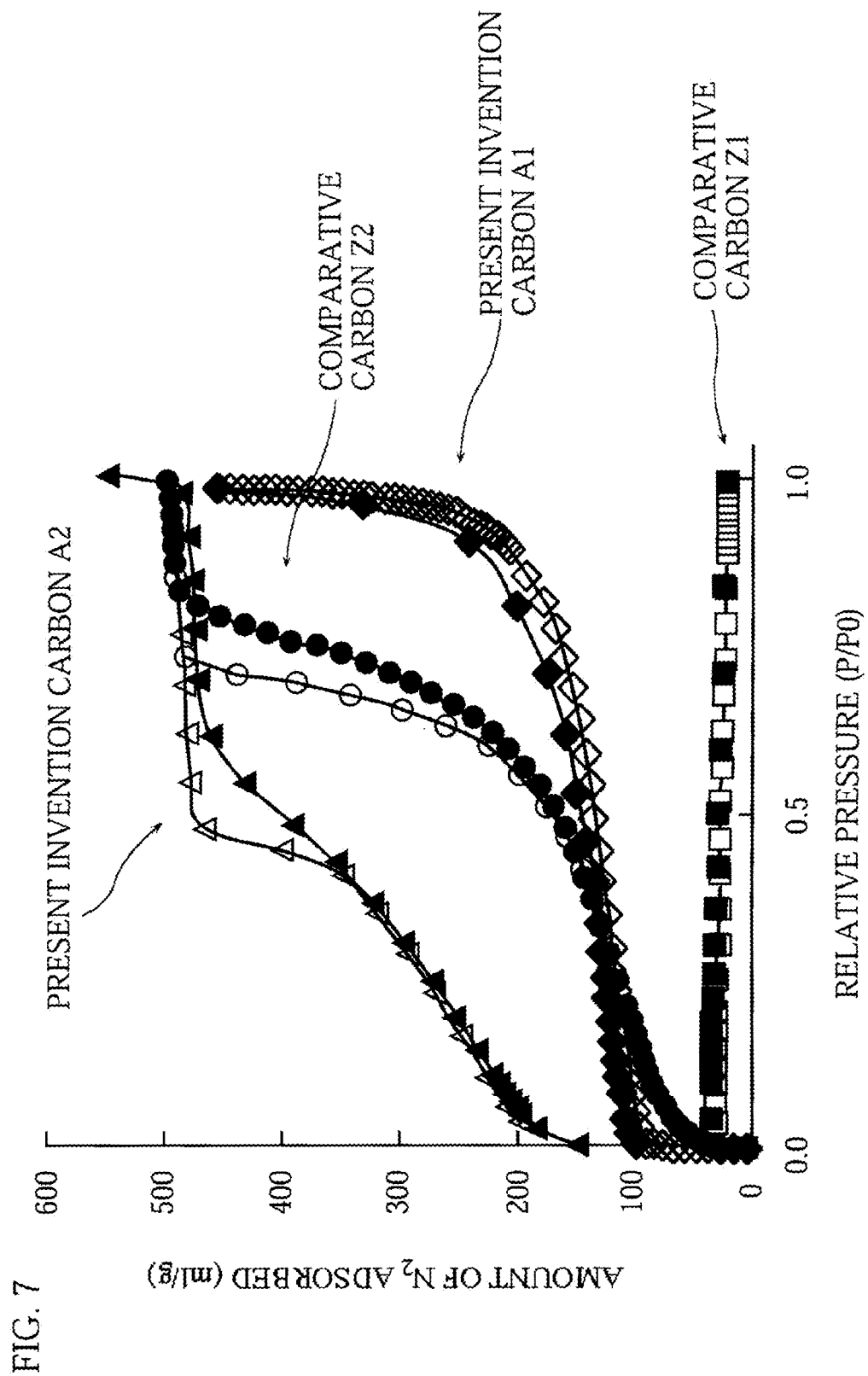
FIG. 7 is a graph showing the relationship of the relative pressure and the amount of $N_2$ adsorbed for the present invention carbons A1 and A2 as well as the comparative carbons Z1 and Z2.

As clearly seen from FIG. 7, when the relative pressure is 1.0, little difference is observed in the amount of $N_2$ adsorbed between the present invention carbons A1, A2 and the comparative carbon Z2. However, when the relative pressure is in the range of 0 to to 0.1, it is observed that the present invention carbons A1 and A2 adsorb large amounts of $N_2$, while the comparative carbon Z2 adsorbs little $N_2$. It is also observed that the amount of $N_2$ adsorbed is very small for the comparative carbon Z1 over the entire range.

The reason is believed to be as follows. In the present invention carbons A1 and A2, mesopores and micropores disposed at the positions facing the mesopores are formed. As a result, the micropores adsorb $N_2$ when the relative pressure is low, while the mesopores adsorb $N_2$ when the relative pressure is high. In contrast, although the comparative carbon Z2 shows a relatively large amount of $N_2$ adsorbed when the relative pressure is 1.0 because the comparative carbon Z2 has mesopores, the comparative carbon Z2 shows a small amount of $N_2$ adsorbed when the relative pressure is from 0 to 0.1 because the comparative carbon Z2 does not have macropores. The comparative carbon Z1 has neither mesopores nor micropores, so the comparative carbon Z1 shows a small amount of $N_2$ adsorbed over the entire relative pressure range.

When the present invention carbons A1 and A2 are compared to each other, it is observed that their amounts of $N_2$ adsorbed are different at each relative pressure. This is believed to be due to the difference in the pore size resulting from the difference in the size of the template particles.

The pore size distribution (mesopore size distribution) in the present invention carbons A1 and A2 was determined using a BJH method. The results are shown in FIG. 8.

Figure 8:
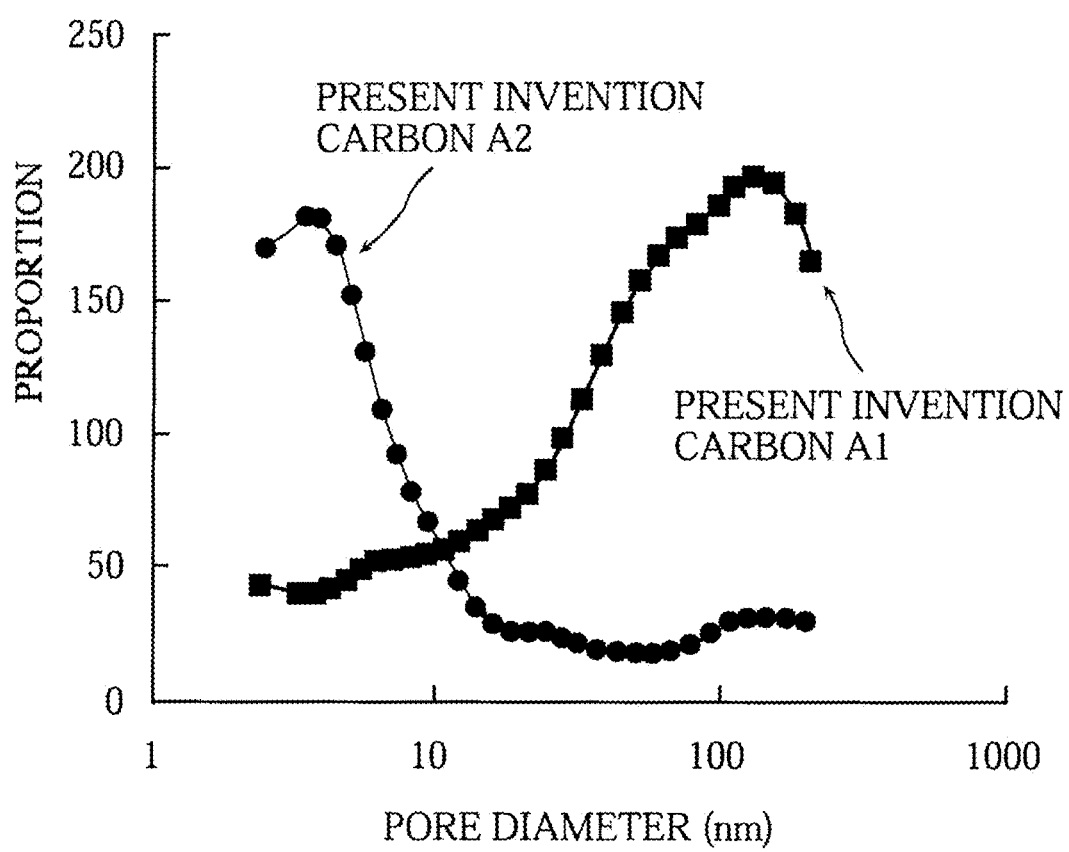
FIG. 8 is a graph showing the relationship between pore diameters and their proportions in the present invention carbons A1 and A2.

As clearly seen from FIG. 8, in the present invention material A1, in which the size of the template particles is 100 nm, the proportion of the pores is large in the vicinity of a pore size of 100 nm. In the present invention material A2, in which the size of the template particles is 5 nm, the proportion of the pores is large in the vicinity of a pore size of 5 nm. These results indicate that the size of the template particles and the size of the obtained pores are substantially the same value.

(Experiment 2)

The BET specific surface area was determined by varying the mixture ratio of the flowable material and the template particles. The results are shown in Table 1. The sizes of the template particles used were 5 nm and 80 nm. The BET specific surface area was obtained by subjecting the obtained carbons to a nitrogen gas adsorption/desorption measurement using Belsorp (made by Bel Japan, Inc.) and analyzing the obtained absorption isotherm. This also applies to the following.

TABLE 1

| Crystallite size (nm) | BET specific surface area (m²/g) | | | |
|---|---|---|---|---|
| | Polyimide/ MgO = 100/0 | Polyimide/ MgO = 80/20 | Polyimide/ MgO = 50/50 | Polyimide/ MgO = 20/80 |
| 5 | 89 | 330 | 700 | 913 |
| 80 | — | 61 | 191 | 360 |

The results shown in Table 1 clearly indicate that the BET specific surface area is greater when the size of the template particles is smaller, and that the BET specific surface area is greater when the proportion of MgO is greater. This means that it is possible to vary the BET specific surface area by varying the size of the template particles and/or the mixture ratio of the flowable material and the template particles, so that it is possible to fabricate a porous carbon that has a desired surface area.

(Experiment 3)

The BET specific surface area was determined by varying the size of the template particles and the type of the flowable material. The results are shown in Table 2.

TABLE 2

| Flowable material | Polyimide | Polyimide | Fluorinated imide | Fluorinated imide |
|---|---|---|---|---|
| Template particle (Crystallite size) | MgO (5 nm) | MgO (2 nm) | MgO (0.5 nm) | CaO (10 nm) |
| Total BET specific surface area (m²/g) | 2400 | 1200 | 1400 | 800 |

The results shown in Table 2 clearly demonstrate that it is possible to control the BET specific surface area by varying the size of the template particles and the type of the flowable material.

(Experiment 4)

The proportions of impurities were analyzed for the present invention materials A1, A2 and commercially available activated carbons by an X-ray fluorescence analysis. The results are shown in Table 3.

The commercially available activated carbons 1 and 2 were ones that use coconut husk as the main source material and in which the specific surface area was expanded by carbonization and steam activation.

TABLE 3

| | Present invention material A2 | Present invention material A1 | Commercially available activated carbon 1 | Commercially available activated carbon 2 |
|---|---|---|---|---|
| C (%) | 92.4 | 95.4 | 92.5 | 94 |
| O (%) | 7.5 | 4.5 | 7.1 | 5 |
| K (ppm) | ND | ND | 1600 | 1100 |
| Mg (ppm) | ND | 220 | 250 | 19 |
| Ca (ppm) | ND | ND | 170 | 124 |
| S (ppm) | ND | 1260 | 205 | 240 |
| Si (ppm) | ND | 203 | 450 | 611 |
| P (ppm) | ND | 14 | 115 | 201 |

In Table 3, ND means that the concentration is less than 0.5 ppm (i.e., below the detection limit)

As clearly seen from Table 3, it is appreciated that the present invention materials A1 and A2 contain remarkably less amounts of impurities than the commercially available activated carbons 1 and 2.

INDUSTRIAL APPLICABILITY

The present invention is applicable to, for example, gas adsorbent materials.

DESCRIPTION OF REFERENCE NUMERALS

1—Polyamic acid resin (Imide-based resin)
2—Magnesium oxide
3—Carbon
4—Pore
5—Porous carbon
10—Mesopores
11—Micropores
12—Carbonaceous Wall

The invention claimed is:

1. A porous carbon comprising:
a carbonaceous wall;
mesopores; and
micropores;
wherein the carbonaceous wall forms a three-dimensional network structure and constitutes an outer wall of the mesopores;
wherein the mesopores are open pores;
wherein the micropores are smaller than the mesopores;
wherein the mesopores are all substantially the same size;
wherein at least a portion of the micropores are formed at positions in the carbonaceous wall that are in direct contact with the mesopores, and
wherein the thickness of the carbonaceous wall is substantially uniform and thinner than the size of the mesopore.

2. The porous carbon according to claim 1, wherein the pore diameter of the pores including the mesopores and micropores is from 0.3 nm to 100 nm.

3. The porous carbon according to claim 1, wherein the specific surface area is from 600 m²/g to 2000 m²/g.

4. The porous carbon according to claim 1, wherein the carbonaceous wall has a spongy and substantially cage-like form.

5. The porous carbon according to claim 1, wherein the carbonaceous wall is substantially made from a flowable material having a carbon yield of from 40% to 85%.

6. The porous carbon according to claim 1, wherein the carbonaceous wall comprises carbon portions and micropores, and the volume of the carbon portion is 40% or greater with respect to the total volume of the carbonaceous wall.

7. The porous carbon according to claim 6, wherein the carbonaceous wall is substantially made from a flowable material having a carbon yield of from 40% to 85%.

8. The porous carbon according to claim 6, wherein the carbonaceous wall has a spongy and substantially cage-like form.

9. The porous carbon according to claim 6, wherein the specific surface area is from 600 m²/g to 2000 m²/g.

10. The porous carbon according to claim 6, wherein the mesopores are connected to each other directly or through the micropores.

11. The porous carbon according to claim 10, wherein the specific surface area is from 600 m²/g to 2000 m²/g.

12. The porous carbon according to claim 6, wherein the pore diameter of the pores including the mesopores and micropores is from 0.3 nm to 100 nm.

13. The porous carbon according to claim 1, wherein the mesopores are connected to each other directly or through the micropores.

14. The porous carbon according to claim 13, wherein the carbonaceous wall is substantially made from a flowable material having a carbon yield of from 40% to 85%.

15. The porous carbon according to claim 13, wherein the carbonaceous wall has a spongy and substantially cage-like form.

16. The porous carbon according to claim 13, wherein the specific surface area is from 600 m$^2$/g to 2000 m$^2$/g.

17. The porous carbon according to claim 13, wherein the pore diameter of the pores including the mesopores and micropores is from 0.3 nm to 100 nm.

\* \* \* \* \*